United States Patent
Owens et al.

(10) Patent No.: US 8,431,283 B2
(45) Date of Patent: Apr. 30, 2013

(54) PROCESS FOR MOLDING COMPOSITE BIPOLAR PLATES WITH REINFORCED OUTER EDGES

(75) Inventors: John N. Owens, Franklin, MI (US); Hamid G. Kia, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1770 days.

(21) Appl. No.: 11/643,392

(22) Filed: Dec. 21, 2006

(65) Prior Publication Data

US 2008/0152975 A1 Jun. 26, 2008

(51) Int. Cl.
*H01M 2/38* (2006.01)
*H01M 2/40* (2006.01)

(52) U.S. Cl.
USPC .......................... 429/457; 429/456; 429/513

(58) Field of Classification Search ............... 429/26
See application file for complete search history.

(56) References Cited

U.S. PATENT DOCUMENTS

2004/0209150 A1* 10/2004 Rock et al. ................. 429/38

FOREIGN PATENT DOCUMENTS

| JP | 61-074322 A | 4/1986 |
|----|----|----|
| JP | 3-022510 A | 1/1991 |
| JP | 2001-266910 A | 9/2001 |
| JP | 2002-367623 A | 12/2002 |
| JP | 2002358973 | * 12/2002 |
| JP | 62002358973 | * 12/2002 |

* cited by examiner

*Primary Examiner* — Ula C Ruddock
*Assistant Examiner* — Patricia Davis
(74) *Attorney, Agent, or Firm* — John A. Miller; Miller IP Group, PLC

(57) ABSTRACT

A process for molding a composite unipolar plate for a fuel cell stack that increases the strength of a header region of the plate. High strength, non-conductive prepeg inserts are positioned within the mold that are shaped to the configuration of the header region, including the openings that define the various inlet and outlet manifolds. A bulk molding compound charge is positioned in the mold and pressed under high heat so that the bulk molding compound disperses in the mold, and covers the prepeg inserts so that the prepeg inserts are cured to the bulk molding compound.

11 Claims, 1 Drawing Sheet

PROCESS FOR MOLDING COMPOSITE BIPOLAR PLATES WITH REINFORCED OUTER EDGES

BACKGROUND OF THE INVENTION

1. Field of the Invention

This invention relates generally to a process for molding composite bipolar plates for a fuel cell stack and, more particularly, to a process for molding composite bipolar plates for a fuel cell stack where the process includes providing one or more pieces of a reinforcement inserts at the header region of the bipolar plates when the bipolar plates are being molded so as to add strength to the outer edges of the plate.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs require certain conditions for effective operation, including proper water management and humidification.

Several fuel cells are typically combined in a fuel cell stack to generate the desired power. For the automotive fuel cell stack mentioned above, the stack may include about two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

SUMMARY OF THE INVENTION

In accordance with the teachings of the present invention, a process for molding a composite unipolar plate for a fuel cell stack is disclosed that increases the strength of a header region of the plate. Because the header region does not need to be electrically conductive, high strength prepeg inserts are positioned within the mold that are shaped to the configuration of the header region, including the openings that define the various inlet and outlet manifolds. A bulk molding compound charge is positioned in the mold and pressed under high heat so that the bulk molding compound disperses in the mold, and covers the prepeg inserts. When the unipolar plate is removed from the mold, the prepeg inserts increase the strength of the header region to reduce the chance that the plate will break during subsequent processing.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a process for molding a composite unipolar plate for a fuel cell stack is merely exemplary in nature, and is in no way intended to limit the invention or its applications or uses.

Figure 1:
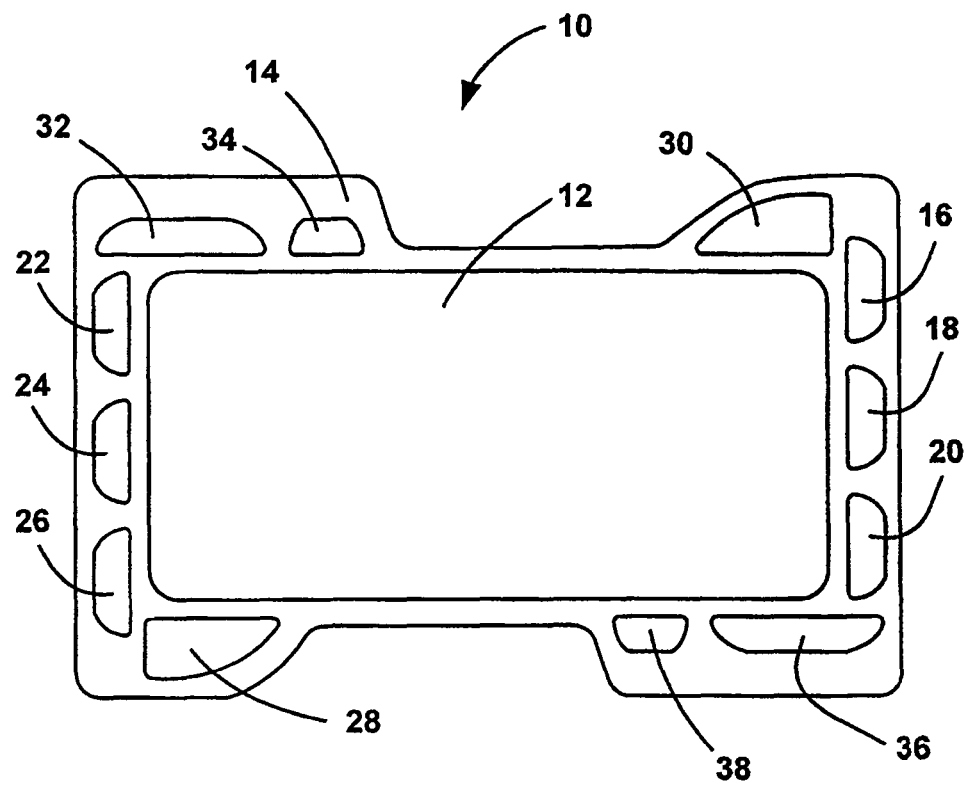
FIG. 1 is a top view of a unipolar plate for a fuel cell stack.

FIG. 1 is a top view of a composite unipolar plate 10 for a fuel cell stack. The unipolar plate 10 can be the anode side or the cathode side of a bipolar plate, where the molding process that forms the plate 10 would form anode flow channels (not shown) or cathode flow channels (not shown). The other of the anode side unipolar plate or cathode side unipolar plate would include the other flow channels and the backside of one or the other of the anode side unipolar plate or cathode side unipolar plate would include cooling fluid channels so that when the anode side and cathode side unipolar plates are secured together, by gluing or the like, the cooling fluid flow channels would be between the plates.

Once the anode side and cathode side unipolar plates are secured together, a diffusion media layer is positioned against the flow channels on each side of the bipolar plate and an MEA is positioned between two diffusion media layers to define a fuel cell. The fuel cell stack is a plurality of fuel cells including an MEA and two diffusion media layers sandwiched between opposing bipolar plates.

The unipolar plate 10 includes an active region 12 where the electro-chemical reaction of the fuel cell takes place. An outer edge of the unipolar plate 10 defines a header region 14 that includes the various manifolds from which the air, hydrogen fuel and cooling fluid are introduced into the fuel cells and from which the anode exhaust gas, the cathode exhaust gas and the heated cooling fluid exit the fuel cell stack. Particularly, the unipolar plate 10 includes cathode input manifolds 16, 18 and 20 and cathode outlet manifolds 22, 24 and 26. Also, the header region 14 includes an anode inlet manifold 28 and an anode outlet manifold 30. Further, the header region 14 includes cooling fluid inlet manifolds 32 and 34 and cooling fluid outlet manifolds 36 and 38. A sealing region 40 provides an area where a seal can be provided to seal the flow channels in the active region 12, as well as the various manifolds.

The unipolar plate 10 is a single piece molded structure. Because the unipolar plate 10 needs to conduct electricity from the electrochemical reaction, only certain materials are suitable for the composition of the plate 10. In one embodiment, the material is a bulk molding compound (BMC) including graphite particles, a thermosetting resin, such as a vinylester, and a filler material that maintains the graphite particles suspended in the plate 10. A charge of the bulk molding compound is placed in the mold that is heated to a certain temperature, such as 400° F. A die press is pressed against the charge to force the charge to flow into all of the areas of the mold to provide the shape of the unipolar plate 10.

Once the unipolar plates are molded, they then go to a deflashing process to remove excess material from the various openings in the header region 14 as well as around the edges of the header region 14. Next, the unipolar plates go to a scuffing operation that removes a thin resin-rich outer layer from both sides of the unipolar plate. It has been found that as a result of the molding process, the graphite particles have a tendency to move away from the surface of the molded plate, increasing its contact resistance. Therefore, it usually is necessary to remove the outer surface of the unipolar plates to improve its electrical conductivity. After the scuffing operation, the unipolar plates are adhered together to form the complete bipolar plate to later be assembled in the fuel cell stack.

Unipolar plates are typically very thin, on the order of 1 mm. Further, the several openings that are formed in the header region 14 for the inlet and outlet manifolds create areas where the unipolar plate 10 is easily cracked and/or broken. Because there are several handling steps for processing the unipolar plate 10, the likelihood that the unipolar plate will become damaged at the header region 14 is significant. Therefore, it would be desirable to increase the strength of the header region 14, without adding significant cost to the stack or the process of assembling it.

The present invention recognizes that the header region 14 does not need to be electrically conductive for the operation of the fuel cell stack. Therefore, the present invention proposes adding a non-conductive, but high strength material at the header region 14 of the unipolar plate 10. In one embodiment, the high strength material is a prepeg insert that is die cut to the shape of the header region 14. The prepeg insert is bonded or cured to the bulk molding compound during the molding process. In one embodiment, the reinforcement of the prepeg insert is a fiberglass fabric. However, as will be appreciated by those skilled in the art, other materials may be equally applicable.

Figure 2:
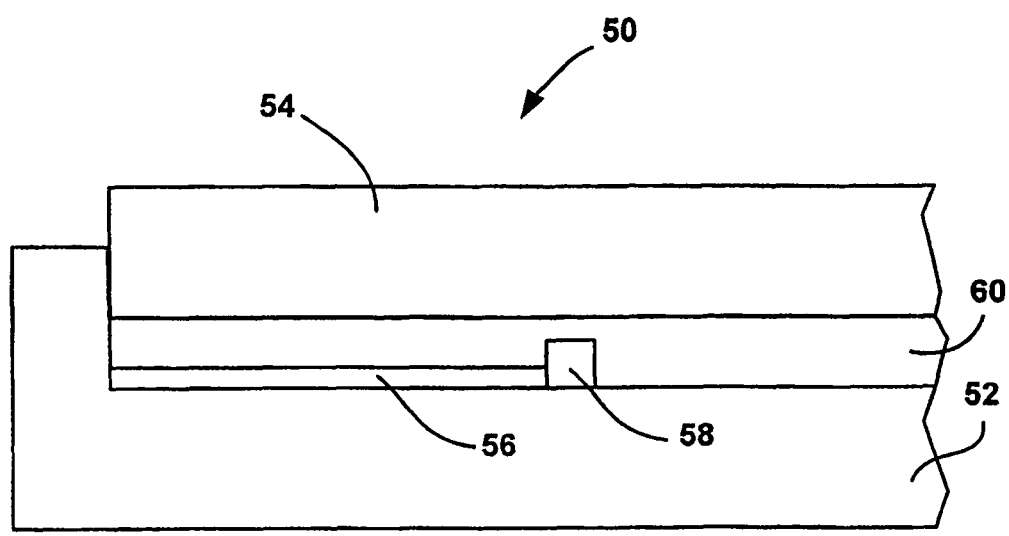
FIG. 2 is a broken-away side view of a mold for making the unipolar plate shown in FIG. 1 that includes a prepeg insert for strengthening a header region of the unipolar plate, according to an embodiment of the present invention.

FIG. 2 is a broken-apart cross-sectional view of a mold 50 for molding the unipolar plate 10, according to an embodiment of the present invention. The mold 50 includes a mold cavity base portion 52 and a moveable mold plug 54 that presses a bulk molding compound 60 into the shape of the mold 50. Prior to closing the mold 50, a prepeg insert 56 is positioned in the mold cavity base structure 52 at the appropriate position. Also, a mold rib 58 is positioned adjacent to the prepeg insert 56 to prevent the bulk molding compound 60 from flowing under the prepeg 56 during the molding process. In one embodiment, the molding rib 58 is positioned where the seal channel will be for the seals in the seal area 40 to define the seal channel during the molding process. When the mold plug 54 is pressed down onto the bulk molding compound charge, the bulk molding compound 60 will spread out to fill the mold cavities, and flow over the mold rib and the prepeg insert 56. The heat and pressure from the molding process causes the bulk molding compound 60 to cure to the prepeg insert 56 so that when it is removed from the mold, the prepeg insert 56 extends all around the other area 14.

The prepeg insert 56 can be made by pre-impregnating a fine fiberglass fabric with a suitable thermosetting resin and advancing the degree of cure. The prepeg insert 56 can be held to a fixture by a vacuum to place it in the mold cavity base portion 52 where it will stick to the hot steel upon contact.

It is desirable that the co-efficient of thermal expansion of the bulk molding component 60 and the prepeg insert 56 be nearly identical. Particularly, it is desirable to prevent the unipolar plate 10 from curling as the temperature of the plate 10 increases that could occur as a result of a different co-efficient of thermal expansion. The co-efficient of thermal expansion of the bulk molding compound 60 would be known, and thus the prepeg insert 56 can be designed to match that co-efficient of thermal expansion. Various fillers can be added to the resin of the prepeg insert 56 to fine tune the co-efficient of thermal expansion to match that of the bulk molding compound 60.

The number of prepeg inserts required for a particular unipolar plate molding would depend on the shape and configuration of the unipolar plate. The unipolar plate 10 may require two prepeg inserts, one for one end of the plate 10 that includes the openings 22, 24, 26, 28, 32 and 34, and one for the other end of the unipolar plate 10 that includes the opening 16, 18, 20, 30, 36 and 38. Other unipolar plate designs may require less or more prepeg inserts. In one non-limiting embodiment, the thickness of the prepeg insert 56 is about one-third of the total thickness of the unipolar plate 10. For example, if the unipolar plate 10 is about 1 mm, then the thickness of the prepeg insert 56 may be about 0.3 mm.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A unipolar plate for a fuel cell stack comprising:
   a composite body portion that defines an active region, a header region and a seal area therebetween, wherein the header region includes a plurality of openings defining inlet and outlet manifolds; and
   at least one prepeg insert cured to the composite body portion in the header region so as to strengthen the header region, wherein the prepeg insert is die cut to a shape of the header region.

2. The unipolar plate according to claim 1 wherein the at least one prepeg insert is made of a non-conductive material.

3. The unipolar plate according to claim 2 wherein the at least one prepeg insert is a thermosetting resin impregnated with a fiberglass fabric.

4. The unipolar plate according to claim 1 wherein the at least one prepeg insert and the composite body portion have about the same co-efficient of thermal expansion.

5. The unipolar plate according to claim 1 wherein the composite body portion is graphite particles suspended in a thermosetting resin.

6. The unipolar plate according to claim 1 wherein the header region includes a cathode inlet manifold, a cathode outlet manifold, an anode inlet manifold, an anode outlet manifold, a cooling fluid in the manifold and a cooling fluid outlet manifold.

7. The unipolar plate according to claim 1 wherein the at least one prepeg insert has a thickness about one-third of the total thickness of the unipolar plate.

8. The unipolar plate according to claim 1 wherein the at least one prepeg insert is a plurality of prepeg inserts.

9. A unipolar plate for a fuel cell stack comprising:
   a composite body portion that defines an active region, a header region and a seal area therebetween, wherein the header region includes a plurality of openings defining inlet and outlet manifolds; and
   at least one prepeg insert cured to the composite body portion in the header region so as to straighten the header region, said prepeg insert being a thermosetting resin impregnated with a fiberglass fabric, wherein the prepeg insert and the composite body portion have about the same co-efficient of thermal expansion, and wherein the prepeg insert is die cut to a shape of the header region.

10. The unipolar plate according to claim 9 wherein the at least one prepeg insert has a thickness about one-third the total thickness of the unipolar plate.

11. The unipolar plate according to claim 9 wherein the at least one prepeg insert is a plurality of prepeg inserts.

\* \* \* \* \*